Feb. 25, 1958      J. Z. DE LOREAN      2,824,750
TORSION BAR WHEEL SUSPENSION
Filed Aug. 5, 1954      3 Sheets-Sheet 1
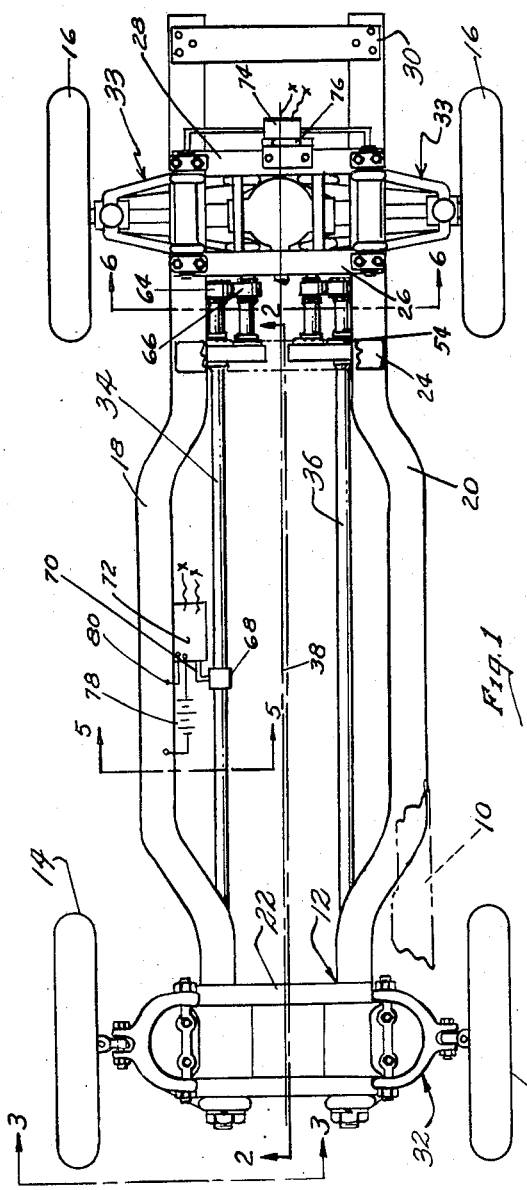
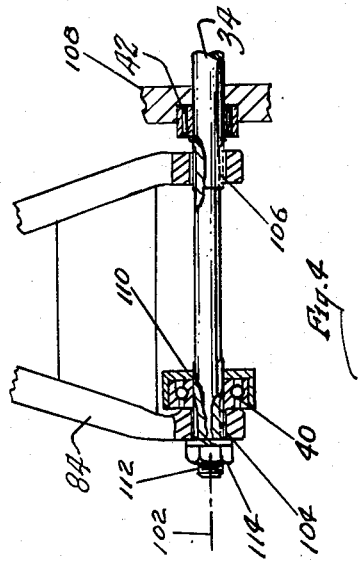
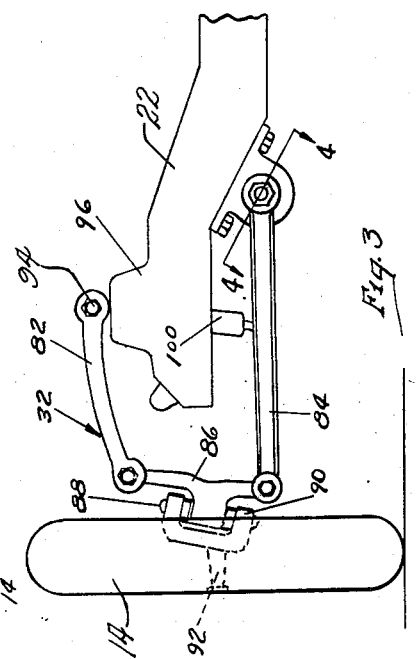
INVENTOR.
JOHN Z. DeLOREAN
BY Wilson, Kedrow, and Gaines
HIS ATTORNEYS Feb. 25, 1958 J. Z. DE LOREAN 2,824,750
TORSION BAR WHEEL SUSPENSION
Filed Aug. 5, 1954 3 Sheets-Sheet 2
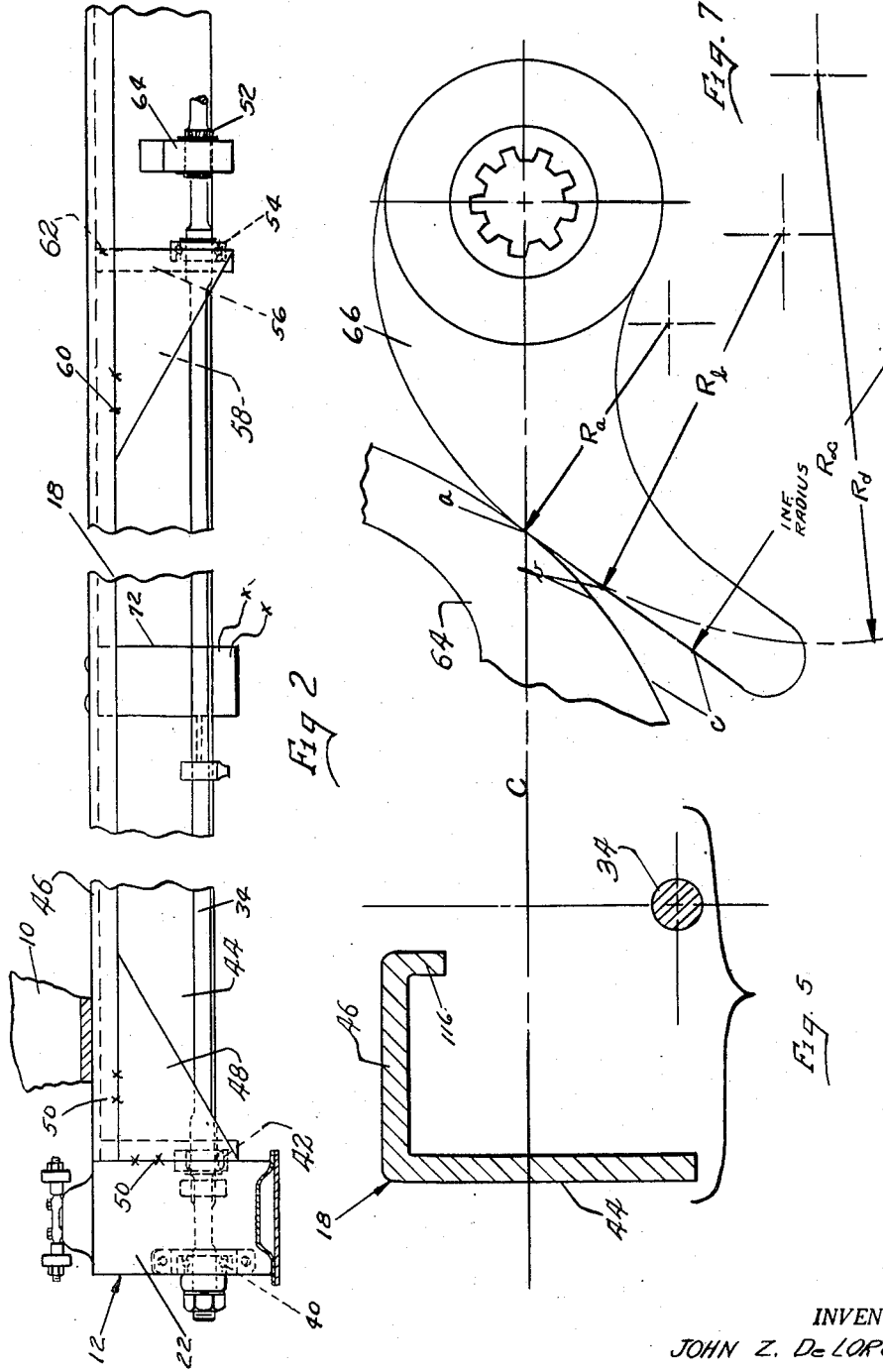
INVENTOR.
JOHN Z. De LOREAN
BY Wilson, Redrow, and Gaines
HIS ATTORNEYS

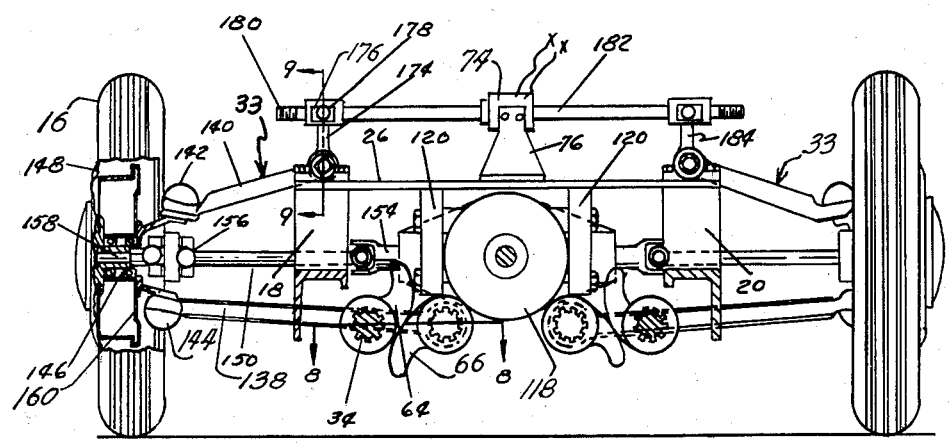
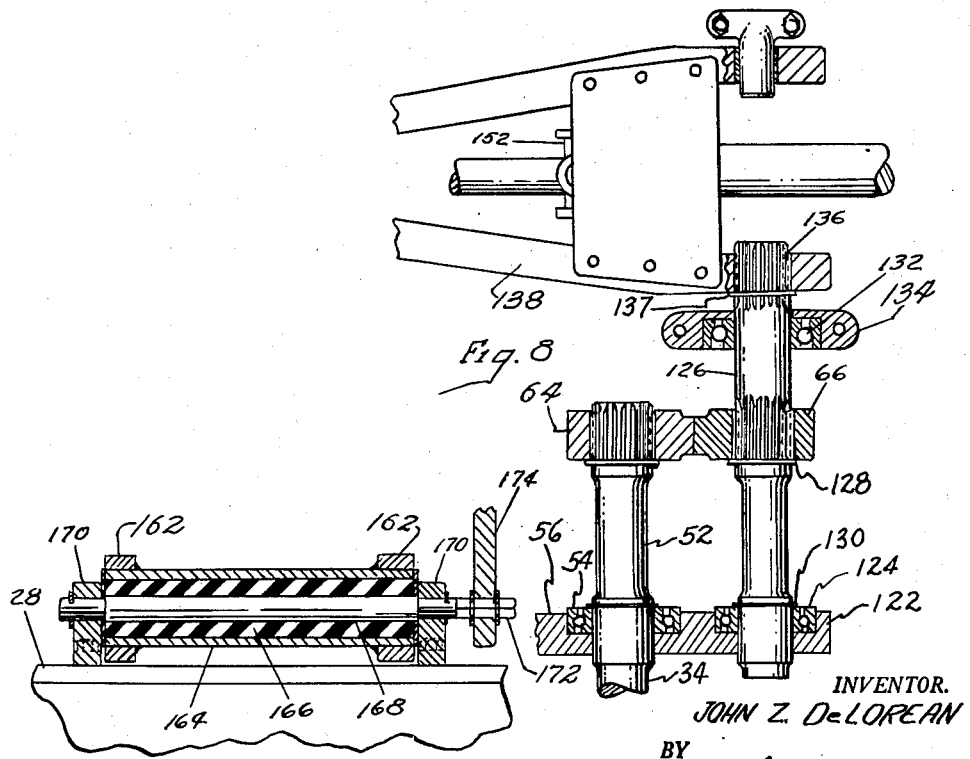

United States Patent Office 2,824,750
Patented Feb. 25, 1958

2,824,750

TORSION BAR WHEEL SUSPENSION

John Z. De Lorean, Detroit, Mich., assignor to Studebaker-Packard Corporation, a corporation of Michigan Application August 5, 1954, Serial No. 448,065

20 Claims. (Cl. 280—106.5)

The present application relates to torsion bar suspensions for wheeled vehicles, particularly to a suspension having a full length torsion bar for interconnecting each wheel at the side of a vehicle with the other wheel at the same side to urge them to oscillate in opposite directions in a manner whereby to produce an anti-galloping motion when either wheel is disturbed.

One or more vehicle suspension systems hitherto known have utilized torsion bar load spring linkages for interconnecting the laterally extending front and rear wheel suspensions at each of the opposite sides of a vehicle in a manner whereby an anti-galloping motion reversal takes place tending to cause a wheel at one side to go into a position of rebound at the time at which the companion wheel on the same side is being forced by road irregularities to travel in the opposite direction, that is in jouncewise travel, and vice versa. For example, one such known suspension system utilizes series connected torsion bar load springs at each side of a vehicle, the series connected load springs at the left hand side of the vehicle elastically interconnecting the movable left front and left rear wheels in a manner to provide for a gear achieved motion reversal therebetween and the opposite series connected load springs similarly interconnecting the opposite front and rear wheels at the right side of the vehicle. The accomplishment of such reversal of motion is achieved through meshing spur gears connected to different ones of the series connected torsion bar load springs at their adjacent ends, and it can be appreciated that this reversal of motion introduces rather excessive and disadvantageous tooth loadings on the gears. The transference and simultaneous reversal of torsion bar twist motion in other known fashions such as by pivot joint linkages has introduced disadvantages and complications not the least of which is binding which tends to occur in the pivot joints under the shock loads experienced in the transference process.

An object of the invention herein presented is to provide a single full length torsion bar spring suspension for each side of a wheeled vehicle which overcomes the foregoing disadvantages and accomplishes the desired reversal of motion through the interposition of heavy single lobed cams in the connection between one end of the single bar and the adjacent wheel suspension.

Further features, objects and advantages will either be specifically pointed out, or become apparent, when for a better understanding of the invention, reference is made to the following written description taken in conjunction with the accompanying drawings, in which:

Figure 1 is a plan view of a vehicle embodying the present invention;

Figure 2 is a side elevational view in section taken along the lines 2—2 of Figure 1;

Figure 3 is a fragmentary front elevation of the vehicle as viewed along the lines 3—3 of Figure 1;

Figure 4 is a sectional view of a front suspension arm taken along the lines 4—4 of Figure 3;

Figure 5 is a cross sectional view of a frame detail taken along the lines 5—5 of Figure 1;

Figure 6 is a transverse section at the vehicle rear looking rearwardly taken along the lines 6—6 of Figure 1;

Figure 7 is an enlarged schematic view of a pair of cams appearing in and corresponding to the showing of Figure 6; and Figures 8 and 9 are sectional views taken along the lines 8—8 and 9—9 of Figure 6.

In Figures 1 and 2 of the drawings a load carrying vehicle body 10 is shown supported on a chassis frame 12 adapted to be spring suspended between a pair of left and right front wheels 14 and between a pair of left and right rear wheels 16. The frame 12 includes a pair of bow shaped longitudinally extending side rails 18, 20 which are rigidly held together as by welded junctures to a drop centered front cross member 22 at their forward ends and at their rear ends are joined together by being commonly riveted to a set of first, second and third intermediate cross members 24, 26, 28 and further riveted to an extreme cross member 30. The front cross member 22 of the frame 12 is connected to each of the front wheels 14 by means of a wish bone type unsprung assembly 32 in which more or less conventional independent wheel construction is used. At a location between the second and third intermediate cross members 26, 28, the frame side rail structure 18, 20 is connected to each of the rear wheels 16 by means of a pair of transversely aligned wish bone type swing axle unsprung assemblies 33.

A longitudinally extending pair of laterally spaced apart mutually similar torsion bars 34, 36 is disposed adjacent the respective side rails 18 and 20 such that the torsion bar 34 occupies a position on the right hand side of the longitudinal vehicle center line indicated at 38 and the torsion bar 36 occupies a corresponding position on the left hand side of the longitudinal center line 38, and in the interests of brevity, only the right hand torsion bar 34 is hereinafter specifically described. The right hand torsion bar 34 is journaled in a set of spaced apart bearings 40, 42 at its forward end so as to be twistable in and with respect to the frame front cross member 12 to which the bearings are mounted. The adjacent side rail 18 has the construction of that of a two-legged angle section bar of which the longer leg 44 is vertically disposed and the shorter 46 at right angles thereto is disposed in a substantially horizontal plane. At the resulting open side of the angle bar section of the side rail 18, a vertically disposed gusset plate 48 is welded so as to be on the inner side of and include the torsion bar 34 and being welded around its edges at 50 so as to adequately support the front cross member 22 in compression. The right hand torsion bar 34 at a point spaced apart from its rear end portion 52 is journaled in a bearing 54 received in a recess in a transverse closing plate 56 supported in compression by a gusset plate 58. After the fashion of the previously noted gusset plate 48, the similar gusset plate 58 is welded at 60 and 62 to the frame side rail 18 and to the closing plate 56 which has an opening through which the end portion 52 of the torsion bar 34 extends. The end portion 52 of the right hand torsion bar 34 is splined and carries a cam 64 which engages a wheel connected cam 66 movable in coordinated motion reversing movement with the first noted spring connected cam 64. The right hand torsion bar load spring 34 is a full length bar, that is, it extends substantially the full length of the wheel base of the vehicle and at its midportion has a bracket 68 and a laterally extending finger 70 rotatively fast thereto which latter controls the actuation of a time delay operating switch device 72 for operating a compensating motor 74 mounted on a vertically upstanding bracket 76 secured as by rivets to the third intermediate cross member 28. The switch controlling finger 70 and its support ing bracket 68 are located at a nodal point or point of neutral movement of the torsion bar load spring 34 such that when both wheels 14 and 16 on the right hand side of the vehicle move simultaneously vertically in the same direction, the finger 70 remains stationary. Unequally applied loads on either the left or right front wheels or the rear wheels cause the nodal point in the torsion bar 34 to move and make the switch controlling finger 70 assume a displaced position whereby it actuates the switch device 72 and ultimately operates the compensating motor 74. The switch device 72 incorporates a time delay mechanism not shown, whose operating characteristic is such as to cause a time delay of between 6 and 8 seconds between the time at which the vehicle body and frame 12 are first moved out of trim, for instance, due to an excessive load in the trunk and the subsequent time at which the compensating motor is operated. Operation of the compensating motor through the intermediary of an appropriate linkage results in the raising or lowering of the rear end of the vehicle body 10 to bring it back into trim in a manner hereinafter more fully described. The time delay switch mechanism device 72 is powered by a positive grounded battery 78 and the device 72 is itself grounded to the side rail 18 at 80. Suitable electrical leads indicated at x—x on the time delay switch device 72 are appropriately connected to suitable companion leads x—x on the compensating motor device 74 for electrically interconnecting the two devices.

In Figures 3 and 4, the right front suspension 32 to which the opposite front suspension 32 is identical, is shown as having a pair of vertically spaced upper and lower control arms 82, 84 of the wish bone type. The control arms 82, 84 are connected at one end by means of pivots to a laterally disposed wheel support arm 86 having a stationary steering king pin 88 carried thereby. The king pin 88 hingedly receives a knuckle support member 90 which integrally incorporates a wheel spindle 92 on which the front wheel 14 is journaled to rotate. At its inner end the upper control arm 82 is pivotally connected to a pivot bar 94 bolted to the top of a hat like or dome section 96 incorporated in the frame front cross member 22. A double acting telescopic type shock absorber 100 is mounted to the domed inner side of the hat section 96 at its upper end and at its lower end is mounted to a plate, not shown, affixed to an intermediate portion of the lower control arm 84. At its inner end the lower control arm 84 is arranged to oscillate about an axis 102 defined by the previously noted frame mounted bearings 40 and 42 and for this purpose engages and is rotatably fast to a pair of spaced apart splines 104, 106 which are formed at the twistable forward end portion of the right hand torsion bar 34. The torsion bar 34 is journaled for such twisting motion in the bearing 42 which is of anti-friction needle bearing construction and which is mounted in a recess in a transversely disposed frame closing plate 108 held in place by the previously noted welded gusset plate 48.

Another forward portion of the torsion bar 34 is journaled in the bearing 40 which is of ball thrust bearing construction and is supported in a bracket 110 detachably affixed to the frame cross member 22 as by means of a set of bolts. The front extremity of the torsion bar 34 is of reduced diameter and threaded at 112 to receive a retaining nut and washer 114 tending to place the torsion bar 34 under pre-stressed tension and retain the right frame side rail 18 in its foreshortened bow shape disposition already considered.

With the thoughts of the preceding paragraph in mind and with Figure 5 particularly in view, it can be seen that the torsion bar 34 tends to be torsionally stressed by the front suspension 32 in a clockwise direction under load whereas due to the operation of the motion reversing cams 64, 66 the rear end of the torsion bar 34 tends to be twisted in an opposing direction of counterclockwise motion. Thus when either the front or the rear wheel 14, 16 on the right hand side of the vehicle is disturbed in one direction, the torsion bar tends to urge the other wheel in an opposite direction with the result that an antigalloping motion occurs and a similar action occurs due to the like operation of the torsion bar 36 on the left hand side of the vehicle; for instance, when the front wheels 14 are deflected upwardly in jounce the torsion bars 34, 36 tend to force the ground engaging rear wheels 16 downwardly relative to the vehicle in a rebound direction with the result that the rear end of the vehicle body 10 is moved upwardly from the ground simultaneously with the upward movement of the front end and an anti-pitching, anti-galloping motion results in distinction to the normal pitching behavior tending to occur in a vehicle chassis and body about a centrally located transverse axis through the chassis.

In connection with Figure 5 it can be noted that the angle member type cross section of the side rail 18 has a deeper effective section in depth than in width as evidenced by the fact that the vertical leg 44 physically exceeds the horizontal leg 46 by about 100% in cross sectional length. An added downturned flange portion 116 may also be provided in a horizontally spaced apart plane parallel to the vertical plane of the leg 44. Owing to the fixed relationship between the opposite ends of the single bar 34 and the chassis side rail 18 due to the action of the mutually carried ball thrust bearings 40 and 54, the torsion bar 34 is stressed in tension and cooperates with the side rail 18 at its open side so as to provide a composite beam of substantial effective depth in section rendering it strongly resistant to bending. Thus about a neutral axis indicated at c—c in Figure 5 the beam strength of the combined longitudinally extending members 18 and 34 was roughly twice that of the angle section side rail 18 standing alone in one physical embodiment contemplated.

The following is given as an example of the dimensions involved in the just noted contemplated physical embodiment:

Material of side rail 18 and torsion bar 34: Steel
Wall thickness of steel of side rail 18: .080"
Outside diameter of torsion bar 34: 1¼"
Length of long leg 44 of angle section: 8"
Length of short leg 46 of angle section: 4"
Approximate distance between short leg 46 and torsion bar 34: 8"

In Figures 6, 7, 8 and 9 an engine driven vehicle differential 118 is disposed between the two side rails 18 and 20 and supported on a pair of spaced apart depending members 120 which are welded between the second and third intermediate cross members 26, 28. The second intermediate cross member 26 supports the previously noted ball thrust bearing 54 by means of a bracket-forming lower portion 122 of the closing plate 56 which also receives another bearing 124 in which a stub shaft 126 is journaled to rotate. The stub shaft 126 has an intermediate splined portion and carries thereon the wheel connected cam 66 which engages the cooperating cam 64 carried by the torsion bar 34. The stub shaft 126 has a pair of spaced apart snap rings 128, 130 respectively holding the cam 66 axially fast thereto and holding the shaft 126 against axial motion with respect to the end bearing 124. The stub shaft 126 is journaled to rotate in an opposite end bearing 132 which is mounted in a bracket 134 secured as by a set of bolts, not shown, to the second intermediate frame member 26. A set of splines 136 formed in the stub shaft 126 and an appropriate snap ring 137 respectively engage the inner end of one of two channel members forming the wish bone type lower control arm 138 in the rear suspension 34 which supports the rear wheel 16. An upper control arm 140 is vertically spaced in its relationship to the lower control arm 138 and through suitable bearings at their outer ends at 142 and 144 the upper and lower control arms are connected to a wheel and brake back plate support member 146 which internally carries the bearings for a hub flange 148, provided for the wheel 16. A swing axle 150 is connected at its inner end through a suitable universal joint 152 to an axle portion 154 driven by the power differential 118. At its outer end the swing axle 150 is connected through a slip joint type of dual universal device 156 to a rotatable drive wheel spindle 158 which splinedly drives the hub flange 148 of the rear wheel 16. The spindle 158 is set to rotate in the noted bearings within the wheel support member 146 which is connected by the joints 142, 144 to the upper and lower control arms and which carries a stationary brake backing plate 160 fast thereto.

The motion reversing cams 64, 66 are basically of the single lobed involute type such that during the transference by them of the reversal of motion between the torsion bar 34 and the wheel suspension lower control arm 138, they mate at substantially equal angular velocities to the end that the angular velocity at points 66a and 64a, Figure 7, are substantially equal and the angular velocity when the indicated points b are engaged is such that 66b is the equal of 64b in terms of angular velocity. The radius of curvature of the wheel connected cam 66 follows that of a normal involute at the RADII indicated at $R_a$ and $R_b$; however, at its extremity or tip of lobe, the cam 66 departs from the normal radius of curvature of the involute extended as indicated at $R_d$. Instead, the terminal portion of the cam 66 is more flattened and at a point c may be exactly flat so as to have an infinite radius of curvature as indicated at $R\infty$. Thus in the extreme positions of jounce of the wheel 16, the flattened portion of the cam 66 rotates around to point of engagement at c with the spring connected cam 64 and imparts to the latter an accelerated non-uniform angular rotation. In effect, therefore, the spring 34 and the spring connected cam 64 stiffen toward the end of jounce movement and provide a stiff spring rate rather than the soft spring rate usually afforded by the torsion bar 34. This advantage is greatly to be desired in the case of extreme jounce movement of the rear wheels 16 wherein it becomes expedient to increase the load spring rate and more forcefully interrupt the continued upward motion of the rear wheel.

The lower links 138 in the rear suspension function in the manner of load links as already noted whereas the upper link 140 operates as a compensating link in conjunction with the compensating motor 74 previously described. For this purpose the upper compensating link 140 has a set of spaced apart inner end portions 162 which are welded or otherwise secured to the rotatable metal sleeve 164 preferably of steel and having a rubber cored interior provided by means of a torsionally deflectable cylindrical body 166 forming a rubber or rubber-like spring. The body 166 is composed of a material of the group comprising rubber, or elastic plastics, resins, neoprene, or the like elastomeric material. The cylindrical outer periphery of the rubber spring 166 is bonded or vulcanized to the interior of the metal sleeve 164 and the cylindrical inner periphery of the rubber spring 166 is bonded or vulcanized to a rotatable compensating shaft 168 of steel which is angularly positionable in a set of end bracket bearings 170 mounted to the third intermediate cross member 28. The compensating steel shaft member 168 has a non-circular cross section 172 at one end which may be four sided and to which an upstanding positioning link 174 is made fast. The link 174 effects a crosshead connection at 176 with a nut 178 received on one outer threaded end 180 of an extended rotor carrying motor shaft 182 in the compensating motor 74. At its opposite end the rotor shaft 182 is similarly threaded for engagement with a positioning link 184 appropriately connected in the just described manner to the upper control arm of the opposite suspension 33. The threaded end portions of the rotor shaft 182 are of opposite hand such that when the motor rotates in a given direction the upstanding positioning links 174 and 184 approach one another or separate from one another in unison.

In the operation of the compensating motor 74 which is actuated by the nodal control switch finger 70 on the torsion bar 34, the positioning links 174, 184 and the compensating shaft members 168 are unstressed under normal static loads of the vehicle. Also, the motor 74 remains idle when the front and rear wheels at either or both sides of the vehicle are simultaneously moved in jounce or simultaneously moved in rebound. Under conditions, however, of the application of heavier than normal loading for instance at the rear of the vehicle, the ground engaging rear wheels 16 are deflected upwardly relative to the body and the switch controlling finger 70 appropriately moves and the time delay switching device 72 is actuated; after the suitable six or eight seconds of time delay in the switching device 72, the motor 74 is energized thereby and the rotor shaft 182 of the motor rotates and threadably separates the upstanding positioning links 174 and 184 from one another in a manner to depress the wheels 16 to their normal position through the operation of stressing the rubber torsion spring 166 which in effect thereafter shares the load with the previously highly deflected load springs 34, 36. Conversely when the static load is lighter than normal at the rear of the vehicle, the ground engaging wheels 16 move downwardly relatively thereto and the torsion load springs 34, 36 are unloaded to the extent of being stressed less than under their normal loading. In such instance, the switch controlling finger and the time delay switch device 72 are actuated such that after the appropriate interval of time delay noted, they cause the motor 74 to pull the positioning levers 174 and 184 toward one another so as to stress the torsion rubber springs 166 in an opposite direction thus contributing to the effective load of the load spring 34, 36 and restoring the wheels 16 to their normal position. Accordingly the vehicle tends to remain in trim, automatically compensating itself whenever there are unequal changes in the forces of the static loadings thereon.

It will be appreciated that the dual stressing of the torsion bars 34, 36 both in their axial direction for affording composite beam strength in tension and in a direction about their axes for the usual load spring function serves several desirable ends. For one thing, the beam function of the torsion bar springs makes possible the retention of the foreshortened bow shape of the opposite side rails 18, 20 whose transversely deflected midportions may be bolted directly to the vehicle body 10 rather than indirectly through the intermediary of the usually provided outrigger brackets thereon generally considered necessary for the side rails in order for them to be appropriately connected to the side sills of the vehicle body 10. In addition an inexpensive angle bar construction having an open sided lower cross sectional portion may be used for the side rails 18 and 20 even though the angle members at the sides afford sufficient beam strength to support the body 10 when they are coupled with the tensionally stressed torsion bars 34, 36.

As herein disclosed, the non-uniformly acting partial involute cams 64, 66 providing for reversing of motion between wheels on the same side of a vehicle are shown disposed adjacent the rear wheel on each side thereof. It is evident that the cams may be located adjacent a front wheel in the connection at the forward end of a torsion bar load spring rather than at the rear end adjacent a rear wheel or else broadly evident that may be used between any wheel suspension and its load spring where motion reversal is desirable. So also each torsion bar load spring is shown to be twistable at both ends in its relationship to a fixed bow shaped side rail which is structurally rigidified by the former but self-evidently the torsion bar may in some cases be twistable on one end and fixed at the other and still be of value in being structurally integrated with and in rigidifying the side rail which latter in the broad sense may be constituted by a mere straight member without a bow shape and having either an upwardly or downwardly open sided cross section completed by the torsion bar for stiffness. The torsion bar springs 34, 36 as disclosed are splined directly at their front ends to the lower suspension link of the front suspension but indeed it is not essential that a direct interengaged splined relationship be employed and in some cases it may be preferable to connect the forward twistable end of the torsion bar to the front suspension by means of a separate interconnecting linkage so as to permit the front suspension to have an axis of oscillation spaced apart from or intersecting the axis of twist of the torsion bar rather than having each just named axis coincident with the other.

Variations within the spirit and scope of the invention disclosed are equally comprehended by the foregoing description.

What is claimed is:

1. A vehicle comprising a load carrying supported part, wheels located on each longitudinal side of the supported part, a supporting rail part adjacent a plurality of wheels located on the same side of the supported part for supporting that side of the latter, said rail part having an incomplete box cross section presenting an open side, suspension means for suspending the supporting rail and supported part on the plurality of wheels aforesaid, bar means adjacent the open side of the rail part in side by side relationship with the latter, means mounted to a portion of the bar means at each end thereof for attachment to the suspension means for torsionally elastically urging the wheels of said plurality in different directions, and means mounted to a portion of the supporting rail part at each end thereof for attachment to the bar means at a corresponding end so as to complete the cross section of the former for structural strength stability in bending by placing the bar means in tension.

2. A vehicle comprising a load carrying supported part, a plurality of wheels located on each longitudinal side of the supported part, a supporting chassis part adjacent each plurality of wheels and located on the same side of the supported part therewith for supporting the latter, each of said chassis parts having an incomplete box cross section presenting an inner open side, suspension means for suspending the supporting and supported parts of the pluralities of wheels aforesaid, bar means between the chassis parts in side by side relationship with the latter, non-circular means formed in a portion of the bar means at either end thereof for attachment to an adjacent suspension means for torsionally biasing the corresponding wheels of said plurality in one direction, and means mounted to portions of the supporting chassis parts at spaced apart locations on each for attachment to the bar means at its opposite ends so as to complete the cross section of the former for structural beam strength resisting bending by placing the bar means in tension.

3. A vehicle comprising a load carrying supported part, pluralities of wheels located on each longitudinal side of the supported part, a supporting chassis part adjacent each plurality of wheels and located on the same side of the supported part therewith for supporting the latter, said chassis parts each having a portion with an incomplete box cross section presenting an inner open side, suspension means for suspending the supporting and supported parts of the pluralities of wheels aforesaid, bar means between the chassis parts in side by side relationship with the latter, means mounted to a portion of the bar means at each end thereof for attachment to the suspension means for torsionally interconnecting all wheels of each said plurality for coordinated motion, and means mounted to a portion of the supporting chassis parts at each end thereof for attachment to the bar means at a corresponding end so as to complete the cross section of the former for structural strength stability in bending by placing the bar means in tension.

4. A vehicle including a body, wheels located on each longitudinal side of the body, a rail part adjacent a plurality of wheels located on the same side of the body for supporting the same, said rail part having an incomplete box cross section presenting an open side, individual wheel suspension means for suspending the rail part and the body on the plurality of wheels aforesaid, bar means adjacent the open side of the rail part in side by side relationship with the latter, means mounted to a portion of the bar means at each end thereof for connection to the suspension means for torsionally elastically urging the wheels of said plurality in different directions, and means mounted to a portion of the rail part at each end thereof for attachment to the bar means at a corresponding end so as to complete the cross section of the former for structural stability strong in bending by placing the bar means under axial stress.

5. A vehicle including a body, pluralities of wheels located on each longitudinal side of the body, a chassis part adjacent each plurality of wheels and located on the same side of the body therewith for supporting the same, said chassis parts each having an incomplete box cross section presenting an inner open side, individual wheel suspension means for suspending the chassis parts and the body on the pluralities of wheels aforesaid, bar means between the chassis parts in side by side relationship with the latter, means mounted to spaced apart portions of each chassis part for attachment to both of the opposite ends of the bar means so as to complete the cross section of the former for structural beam strength in bending for placing the bar means under axial stress, and means mounted to either of the opposite ends of the bar means for attachment to a suspension means for providing bias to the associated wheel.

6. A vehicle including a body, wheels located on each longitudinal side of the body, a rail part adjacent a plurality of wheels located on the same side of the body for supporting the same, said rail part having an incomplete box cross section presenting an open side, individual wheel suspension means for suspending the rail part and the body on the plurality of wheels aforesaid, bar means adjacent the open side of the rail part in side by side relationship with the latter and having a splined portion at each end thereof, means connected to the splined portions of the bar means for attachment to the suspension means for torsionally elastically urging the wheels of said plurality in opposite directions, and means mounted to a portion of the rail part at each end thereof for attachment to the bar means at a corresponding end so as to complete the cross section of the former for structural beam strength in bending by placing the bar means under axial stress.

7. A vehicle including a body, a plurality of wheels located on each longitudinal side of the body, a rail part adjacent two longitudinally spaced apart wheels located on the same side of the body for supporting the same, said rail part having an incomplete box cross section presenting an open bottom side, individual wheel suspension means for suspending the rail part and the body on the two said wheels of the plurality aforesaid, bar means adjacent the open bottom side of the rail part in side by side relationship with the latter, means connected to non-circular portions of the bar means at each end thereof for attachment to the suspension means for torsionally elastically urging the two wheels of said plurality in opposite directions, and means mounted to a portion of the rail part at each end thereof for attachment to the bar means at a corresponding end so as to complete the cross section of the former for structurally stable strength in bending by placing the bar means under axial stress of tension.

8. A vehicle including a body, wheels located on each longitudinal side of the body, a rail part adjacent a plurality of wheels located on the same side of the body for supporting the same, said rail part having an incomplete box cross section presenting an open side, individual wheel suspension means for suspending the rail part and the body on the plurality of wheels aforesaid, bar means adjacent the open side of the rail part in side by side relationship with the latter, means mounted to a portion of the bar means at each end thereof for attachment to the suspension means for torsionally elastically urging the wheels of the plurality in different directions, and thrust bearing means mounted to a portion of the rail part at each end thereof for attachment to the bar means at a corresponding end so as to complete the cross section of the former for structural stability in bending by placing the bar means under tension.

9. A vehicle including a body, wheels located on each longitudinal side of the body, a rail part adjacent a plurality of wheels located on the same side of the body for supporting the same, said rail part having an incomplete box cross section presenting an open side, individual wheel suspension means for suspending the rail part and the body on the plurality of wheels aforesaid, torsion bar means adjacent the open side of the rail part in side by side relationship with the latter, interengaged spline means on a portion of the torsion bar means at each end thereof for attachment to the suspension means for torsionally interconnecting the wheels of said plurality for coordinated movement in different directions, and bearing means mounted to a portion of the rail part at each end thereof for attachment to the torsion bar means at a corresponding end so as to complete the cross section of the former for structural stability in bending by placing the torsion bar means under tension.

10. A vehicle including a body, wheels located on each longitudinal side of the body, a rail part adjacent a plurality of wheels located on the same side of the body for supporting the same, said rail part having an incomplete box cross section presenting an open side, individual wheel suspension means for suspending the rail part and the body on the plurality of wheels aforesaid, bar means adjacent the open side of the rail part in side by side relationship with the latter, means mounted to the suspension means for attachment to a set of splines on each end of the bar means for transmitting a torsional bias by the latter urging the wheels of said plurality in opposite directions, said last mentioned means including at least one motion reversing set of lobed cams, and means mounted to a portion of the rail part at each end thereof for attachment to the bar means at a coresponding end so as to complete the cross section of the former for structural strength in bending by placing the bar means under axial stress.

11. A vehicle including a body, wheels located on each longitudinal side of the body, a rail part adjacent a plurality of wheels located on the same side of the body for supporting the same, said rail part having an incomplete box cross section presenting an opened lower side, individual wheel suspension means for suspending the rail part and the body on the plurality of wheels aforesaid, bar means adjacent the open side of the rail part in side by side relationship with the bottom of the latter, means mounted to the suspension means for attachment to a set of splines on each end of the bar means for transmitting a torsional bias by the latter urging the wheels of said plurality in opposite directions, said last mentioned means including at least one motion reversing set of lobed cams of which one cam has an involuted intermediate portion for imparting an equal angular velocity to the other cam in a neutral position and having a substantially straight extreme portion for subjecting the other cam to a relatively accelerated angular motion in an extreme position, and means mounted to spaced apart portions of the rail part for attachment to the end portions of the adjacent bar means for adding the structural stability of composite beam strength to the former by placing the latter under tension.

12. In a three link individual suspension for vehicles having first, second and third vertically spaced oscillatable elements connected at one end to an outer wheel connected member, universal joint means mounted to an inner portion of the first element for attachment to a power driving vehicle differential, means forming one of a cooperating pair of cam members and mounted to an inner portion of the second element, a torsionally elastic load spring means connected to said inner portion of the second element which is normally loaded thereby at normal vehicle loads and relatively heavily loaded by relatively heavy loads, a compensating mechanism carried by the body, and torsionally elastic core means mounted to an inner portion of the third element for attachment to said compensating mechanism which stresses the core of the core means at heavy vehicle loads in load sharing relationship with the load spring means and which materially reduces or largely eliminates the aforesaid core stresses therein at normal vehicle loads.

13. A three link individual wheel suspension for vehicles having first, second and third vertically spaced swinging elements connected at one end to an outer wheel connected member, universal joint means mounted to the inner end of the first swinging element for attachment to a power driving vehicle differential, means forming a member of a motion reversing cam mechanism and mounted to the inner end of the second swinging element, a torsionally elastic load spring means connected to said inner end of the second swinging element which is normally loaded thereby at normal static vehicle loads and heavily loaded at heavy vehicle loads, a compensating mechanism, and a dual peripheried elastic body mounted with one periphery fast to the inner end of the third swinging element for attachment to said compensating mechanism which stresses the other periphery of the elastic body at heavy vehicle loads in load sharing relationship with the load spring means and which materially reduces or largely eliminates the stresses therein under normal static vehicle loads.

14. A three link individual suspension for vehicles having first, second and third vertically spaced oscillatable elements connected at one end to an outer wheel carrying member, universal joint means mounted to an inner portion of the first element for attachment to a power driving vehicle differential, means forming one member of a cam mechanism and mounted to an inner portion of the second element, a torsion bar connected to said inner portion of the second element which is normally torsionally loaded thereby at normal static vehicle loads and relatively heavily torsionally loaded at relatively heavy vehicle loads, a compensating mechanism, and a rubber cored torsion spring mounted to an inner portion of the third element for attachment to said compensating mechanism which stresses the rubber core of the torsion spring at heavy vehicle loads in load sharing relationship with the torsion bar and which materially reduces or largely eliminates such stresses therein at normal static vehicle loads.

15. A three link individual suspension for vehicles having vertically spaced load, compensating and driving elements connected at one end to an outside wheel carrying member, universal joint means mounted to an inner portion of the driving element for attachment to a power drive vehicle differential, means forming one member of a cam mechanism and mounted to an inner portion of the load element, a torsion bar connected to said inner portion of the load element which is normally torsionally loaded thereby at normal vehicle loads and relatively heavily torsionally loaded at relatively heavy vehicle loads, a compensating mechanism, and a rubber cored torsion spring mounted to an inner portion of the compensating element for attachment to said compensating mechanism which torsionally stresses the rubber core of the torsion spring at heavy vehicle loads in load sharing relationship with the torsion bar and which materially reduces or largely eliminates the torsional stresses therein at normal vehicle loads.

16. A multiple link individual wheel suspension for vehicles having first, second and third vertically spaced oscillatable elements connected at one end to an outer wheel connected member, means forming a member of a cam mechanism and mounted to the inner end of the third element, a torsion bar connected to said inner portion of the third element which is forced into a normal position thereby at normal static vehicle loads and which tends to assume deflected positions at increased loads, universal joint means mounted to the inner end of the second element for attachment to a power driving vehicle differential, a compensating mechanism, and a cored rubber spring mounted to the inner end of the first element for attachment to said compensating mechanism which stresses the core of the rubber spring at increased vehicle loads so as to restore the wheel connected member and the torsion bar from a deflected position to the normal position and which materially reduces or largely eliminates the stress in the core under normal static vehicle loads.

17. In a vehicle, a chassis frame longitudinal member having a midportion of general bow shape between its opposite end portions and being at least in part of an open sided incomplete box cross section, bar means adjacent the open side of the frame member in side by side relationship with the latter, and first and second means for stressing said bar means in an axial direction and in a direction about its axis, said first means being formed in the opposite end portions of the bar means for attachment to separate vehicle wheel suspension means, and said second means being mounted to the opposite end portions of the frame member for attachment to the corresponding end portions of the bar means so as to complete the cross section of the former for structural strength stability in bending by placing the bar means under tension.

18. In a vehicle, a chassis frame having a member with an open sided portion of incomplete box cross section, bar means adjacent the open side of the frame member in side by side relationship with the aforesaid portion of the latter, and first and second structures for stressing said bar means about its axis and in an axial direction, said first structure including means formed in at least one of the opposite end portions of the bar means for attachment to vehicle suspension means, and said second structure including spaced apart means mounted to said chassis frame for attachment to the adjacent end portions of the bar means so as to complete the cross section of the open sided portion of the frame member for composite structural beam strength by placing the bar means under axial stress.

19. In a vehicle, a chassis frame having a member with an open sided portion of incomplete box cross section, a torsion bar load spring disposed in side by side relationship with the latter portion adjacent the open side thereof, means formed in a portion of the torsion bar load spring for connection to a vehicle wheel suspension means, and means mounted to portions of the chassis frame for attachment to the opposite end portions of the torsion bar load spring so as to complete the cross section of said portion of the frame member of incomplete box cross section for imparting composite structural beam strength thereto by placing the torsion bar load spring under load sharing stresses in an axial direction.

20. In a vehicle, a chassis frame having a member with an open sided portion of incomplete box cross section, a single torsion bar having a side by side relationship with the latter portion adjacent the open side thereof, a non-circular portion formed in one of the opposite ends of the torsion bar for attachment to a vehicle wheel suspension means and a non-circular portion formed in the opposite end of the torsion bar, and means mounted to portions of the frame member for attachment to the adjacent opposite ends of the torsion bar so as to complete the cross section of the former for attaining the structural strength of a composite beam by placing the torsion bar under tension stress.

References Cited in the file of this patent
UNITED STATES PATENTS

| | | |
|---|---|---|
| 1,247,993 | Olson | Nov. 27, 1917 |
| 1,704,928 | Thoms | Mar. 12, 1929 |
| 2,174,996 | Rabe | Oct. 3, 1939 |
| 2,563,261 | Oster | Aug. 7, 1951 |
| 2,577,761 | Hickman | Dec. 11, 1951 |
| 2,607,609 | Allison | Aug. 19, 1952 |